United States Patent [19]

Higashiyama

[11] 4,389,688
[45] Jun. 21, 1983

[54] MAGNETIC HEAD SUPPORTING MECHANISM

[75] Inventor: Noboru Higashiyama, Kamakura, Japan

[73] Assignee: Mitsubishi Denki Kabushiki Kaisha, Tokyo, Japan

[21] Appl. No.: 224,678

[22] Filed: Jan. 13, 1981

[30] Foreign Application Priority Data

Jan. 22, 1980 [JP] Japan .................................... 55/6110

[51] Int. Cl.³ ........................ G11B 5/012; G11B 5/48; G11B 5/52; G11B 21/16
[52] U.S. Cl. ..................................... 360/104; 360/98; 360/107
[58] Field of Search ............... 360/104, 105, 106, 107, 360/109, 98, 99, 102, 103, 84

[56] References Cited

U.S. PATENT DOCUMENTS

| 4,081,847 | 3/1978 | Shimada | 360/107 |
| 4,129,891 | 12/1978 | Ragle | 360/98 |
| 4,216,505 | 8/1980 | Grant | 360/104 |
| 4,306,258 | 12/1981 | Higashiyama | 360/104 |
| 4,321,639 | 3/1982 | Aarts | 360/104 |

*Primary Examiner*—Robert M. Kilgore
*Attorney, Agent, or Firm*—Oblon, Fisher, Spivak, McClelland & Maier

[57] ABSTRACT

A magnetic head supporting mechanism comprises a damper placed between a spring operation part of a head-supporting plate spring for supporting and mounting a magnetic head and a holder for supporting and fixing said plate spring thereby damping vibration of said spring operation part by surface friction between said damper and said spring operation part.

10 Claims, 19 Drawing Figures

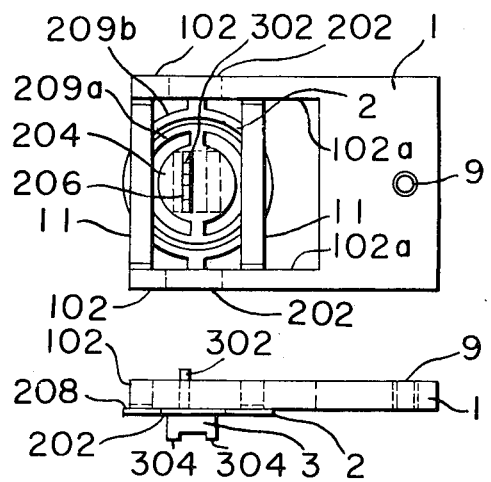
FIG. 1
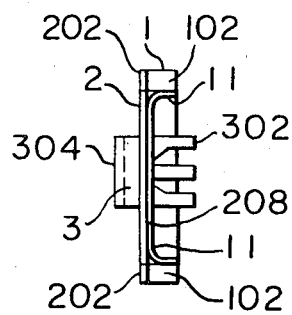
FIG. 3
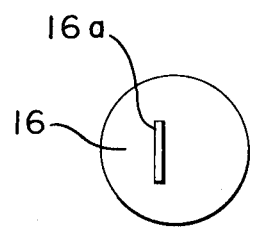
FIG. 2
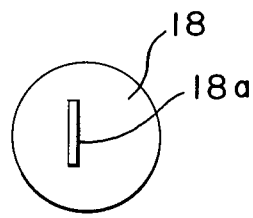
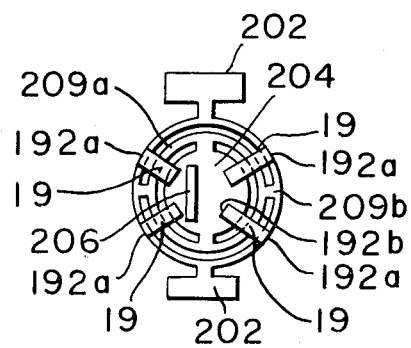
FIG. 4    FIG. 5
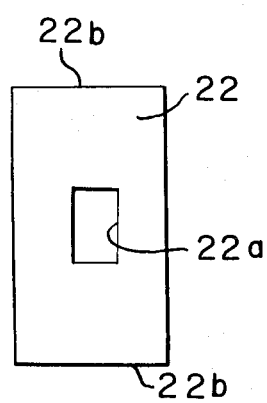
FIG. 6    FIG. 7

MAGNETIC HEAD SUPPORTING MECHANISM

BACKGROUND OF THE INVENTION

1. Field of the Invention

The present invention relates to a magnetic head supporting mechanism which absorbs vibration of a spring operation part of a plate spring with a damper connected between the spring operation part and a holder for mounting the plate spring.

2. Description of the Prior Arts

In the conventional magnetic head supporting mechanism, a magnetic head is usually supported through a thin plate spring by a supporting arm or a holder for mounting. The plate spring is usually a rectangular or circular frame spring or a gimbal spring. Beside these structures, it has been known to combine the supporting arm with the gimbal spring in one-piece. These are disclosed in U.S. Pat. No. 4,089,029 (Daniel Owen Castrodale et al.) and U.S. Pat. No. 4,129,891 (Herbert U. Ragle); U.S. Pat. No. 4,306,258 and U.S. Pat. No. 4,349,851 filed by the applicants.

SUMMARY OF THE INVENTION

It is an object of the present invention to provide a magnetic head supporting mechanism which imparts remarkable effect for improvement of quality of signal amplitude given by a magnetic head in a driving device of any disc device such as a contact start type disc device, a non-contact start type disc device, and a double side type flexible disc device.

The foregoing and other objects of the present invention have been attained by providing a magnetic head supporting mechanism wherein a damper made of a rubber sheet etc. is connected between a spring operation part of a head supporting plate spring for holding a magnetic head and a holder supporting the plate spring so as to absorb vibration of the spring operation part by surface friction between the damper and the spring operation part.

In accordance with the present invention, in the contact start type disc device, a remarkable effect for reducing wear loss of the disc and the head can be expected at the start and in the non-contact start type disc device, the effect for shortening the head loading time for loading the head can be expected and in the double side type flexible disc device which has been highly developed in the uses, the effect for shortening the seek-settling time can be expected and the effect wear for reducing the wear loss at the contact of the head with the disc especially loss of the disc referred to as tapping life is expected.

BRIEF DESCRIPTION OF THE DRAWINGS

FIG. 1 is a plane view of a head supporting mechanism of the present invention.

FIG. 2 is a side view of the embodiment of FIG. 1;

FIG. 3 is a side view of the embodiment of FIG. 1 in the vertical direction;

FIG. 4 is a plane view of a gimbal spring (2) as the important part in the second embodiment of the present invention;

FIG. 5 is a plane view of a thin rubber sheet (18) as the important part in the third embodiment of the present invention;

FIG. 6 is a plane view of the fourth embodiment of the present invention;

FIG. 7 is a plane view of a thin rubber sheet (22) used in the sixth embodiment of the present invention;

DETAILED DESCRIPTION OF THE PREFERRED EMBODIMENTS

Figure 8:
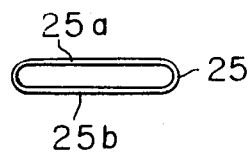
FIG. 8 is a front view of a rubber sheet (25) used in the seventh embodiment of the present invention.
Figure 9:
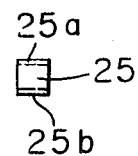
FIG. 9 is a side view of the embodiment of FIG. 8.
Figure 10:
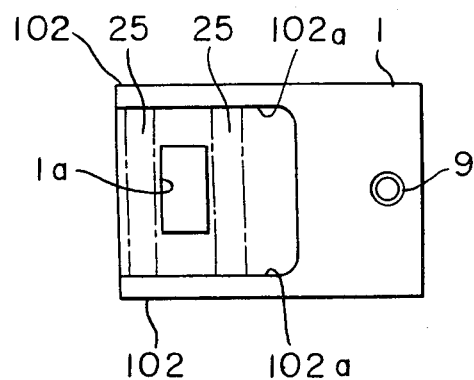
FIG. 10 is a plane view of a holder (1a) used in the seventh embodiment of the present invention.
Figure 11:
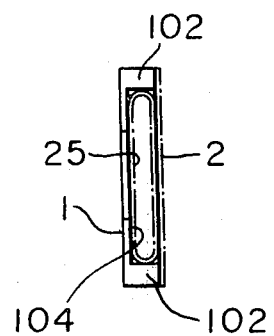
FIG. 11 is a side view of the embodiment of FIG. 10.
Figure 12:
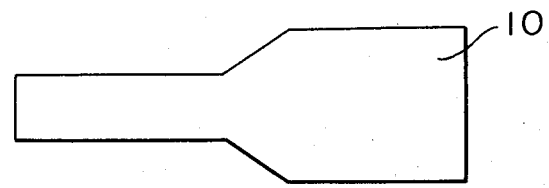
FIG. 12 is a plane view of a holder (29) used in the eighth embodiment of the present invention.
Figure 13:
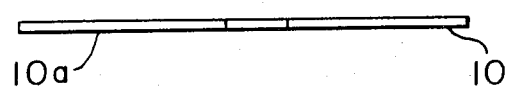
FIG. 13 is a side view of the holder of FIG. 12.

Referring to FIGS. 1, 2 and 3, the first embodiment of the present invention will be illustrated.

The reference (1) designates a holder which has a forked plate shape; (2) designates a gimbal support spring for supporting a head (3). (202) designates an edge of the spring (2), on which the edge (102) of the holder (1) is firmly mounted by a spot welding or a binder; (204) designates a ground part of the gimbal spring (2) and a head core (302) of the head (3) is inserted into a rectangular hole (206) formed on the ground part (204) and fixed to it with a binder; (304) designates a sliding surface of the head (3) which has two-rail shape in this embodiment; (9) designates a female screw screwed in the holder (1); (11) designates a rubber sheet which has a damper function as the important feature of the present invention and is a thin rubber sheet in this embodiment. The rubber sheet (11) is bonded on the inner surface (102a) of the forked edge (102) of the holder (1) to contact in parallel with the upper surface (208) of the gimbal spring (2). The contact is preferably a slight pushing condition or non-pushing contact though it is possible to contact them only when the gimbal spring (2) bends for a specific degree.

In this embodiment, two rubber sheets (11) are used to hold the ground part (204) and the head (3). It is important, in the assembly for the head supporting mechanism, to adjust the assembly so as to prevent deformation of the sliding surface (304) for the holder (1) of the head (3) by the pressure of the rubber sheet (11). In this embodiment, the rubber sheet (11) is placed in the plane so as to contact with the ring springs (209a), (209b) of the gimbal spring (2).

The second embodiment will be illustrated. The second embodiment has substantially the same structure as that of the first embodiment shown in FIGS. 1 to 3 except that a reinforcing plate (16) shown in FIG. 4 is placed on the assembly of the first embodiment. A rectangular hole (16a) is formed on the reinforcing plate (16) and the size of the hole is substantially the same as that of the rectangular hole (206). The diameter of the reinforcing plate (16) is substantially the same as the diameter of the outer ring (209b) of the ring spring of the gimbal spring (2). As a result, it is clear that when the reinforcing plate (16) is mounted on the ground part (204) in the upper side (208) of the gimbal spring (2), the reinforcing plate is placed to cover the gimbal spring (2). In this embodiment, the rubber plate (11) is brought into contact through the reinforcing plate (16) with the gimbal spring (2). The condition for mounting the rubber sheet (11) is the same as that of the first embodiment. As a result, the rubber sheet (11) does not contact with the ring type springs (209a), (209b), but contacts with the head (3), which is different from the first embodiment. The reinforcing plate (16) is formed of a metallic thin plate or a hard plastic plate.

In the third embodiment, a thin rubber sheet (18) shown in FIG. 5 which has substantially the same shape as the reinforcing plate (16) used in the second embodiment and has a rectangular hole (18a) is bonded on the ground part (204) as the second embodiment instead of to the reinforcing plate (16) with a binder. In this embodiment, the strip rubber sheet (11) used in the first and second embodiments is not used. As a result, the thin rubber sheet (18) bonded on only the ground part (204) is always kept in contact with the gimbal spring (2) in any condition. The rubber sheet used should be soft and have high flexibility.

Referring to FIG. 6, the fourth embodiment will be illustrated. The parts are the same as those of the first, second and third embodiments except that the structure on the gimbal spring (2) is different. As shown in FIG. 6, in this embodiment, each thin rubber sheet (19) extends radially from the upper part of the ring springs (209a), (209b) to the ground part and the edges (192a), (192b) of the thin rubber sheet and are bonded to the outer ring part (209b) and the ground part (204) with a binder. In the fourth embodiment, the flexibility of the thin rubber sheet (19) is the same as that of the former embodiment.

The gimbal spring (2) having the above-mentioned structure is equipped in the holder (1) in the same manner are previously. The number of the rubber sheets (19) can be varied in view of the spring constant of the gimbal spring (2) without any adverse effect of the present invention.

In the fifth embodiment, the ground part (204) of the gimbal spring (2) is coated with a rubber with or without masking of the ground part (204) and with masking of the edge. In this embodiment, the other parts are substantially the same as the parts used in the first embodiment except for non-use of the strip rubber sheet (11), the same as the second embodiment except for non-use of the rubber sheet (11) and the reinforcing part (16), the same as the third embodiment except for non-use of the round rubber sheet (18); or the same as the fourth embodiment except for non-use of the rubber sheet (9).

In the sixth embodiment, the thin rubber sheet (22) shown in FIG. 7 is used. In FIG. 7, the rectangular hole (22a) is formed so as to prevent the contact with the head core (302) of the head (3) on the ground part (204). The diagonal length of the rectangular hole (22a) of the rubber sheet (22) in this embodiment is shorter than the diameter of the ground part (204). In this embodiment, the rubber sheet (22) can be equipped by bonding the end surface (22b) of the rubber sheet (22) on the inner surface (102a) of the forked edge of the holder (1) instead of the rubber sheet (11) of the first embodiment in the same manner for adjusting the rubber sheet (11). As it is clear, the rectangular hole (22a) is smaller than the diameter of the ground part (204) whereby the rubber sheet (22) will contact with only the ground part (204) in the bending of the gimbal spring (2). In the non-operation state, such as the step of departing the head (3) from the disc or the departed stop state, the ring type springs (209a), (209b) are vibrated, however, the vibration is attenuated by contacting the springs with the rubber sheets (22).

Referring to FIGS. 8, 9, 10 and 11, the seventh embodiment will be illustrated. The shapes of the holder (1), the gimbal spring (2) and the head (3) and the bonding method thereof are the same as those of the first embodiment. In this embodiment, the condition for the rubber sheet is different from the suspending condition in said other embodiments. The rubber sheets (25) are used in this embodiment. As shown in the drawings, one end (25a) of each thin rubber sheet (25) is bonded to the bottom part (104) of the holder (1) and curved by the gimbal spring (2) to apply a slight pressure and the other end (25b) is brought into contact with the surface of the ground part (204) of the gimbal spring (2). The rectangular hole (1a) of the holder (1) has a size large enough to prevent the contact of the core (302).

As a modification of this embodiment, it can be considered to contact the rubber sheets with only the ring parts (209a), (209b) without extending them to the ground part (204) but by extending them near the inner surface of the inner ring (209a).

Referring to FIGS. 12, 13, 14, 15, 16 and 17, the eighth embodiment will be illustrated. In comparison with the structures of the first to seventh embodiments, the structure of this embodiment is slightly different though the fundamental concept is substantially the same.

Figure 14:
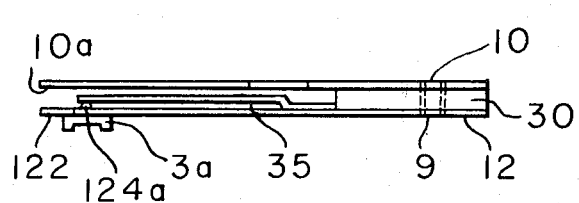
FIG. 14 is a side view of the eighth embodiment.
Figure 15:
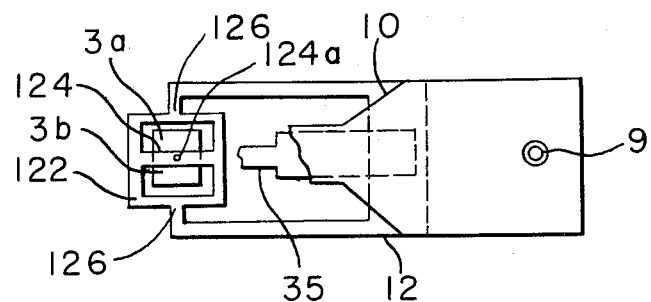
FIG. 15 is a plane view of the parts of FIG. 14 from the disc side with a partially broken view of a pushing plate spring (35) and a holder (29) to be easily understood.
Figure 16:
FIG. 16 is a plane view of the pushing spring which is shown by the partially broken view.
Figure 17:
FIG. 17 is a schematic view of pad (40) as the important part in the eighth embodiment.

The reference (10) designates a holder which is a plate having the shape shown in the drawings as one example. FIG. 14 is a side view of the assembly. The base of the head-supporting spring (12) is connected through the spacer (30) to the holder (10) in one-piece by a spot welding etc. The plane view of the plate spring (12) is shown in FIG. 15. A frame (122) for supporting the head (3a) is formed at the end and a beam (124) is connected in one-piece at the center of the frame. The plate spring (12) can be fabricated by an etching method etc. A projection (124a) is formed at the center of the width and the center of the length of the beam (124) by a punching method etc. The head (3a) is firmly bonded to the beam (124) with a binder and is placed to coincide the center of the projection (124a) with the configuration center of or the floating force center of the head (3a). The reference (35) designates a pushing spring and the edge (35a) of the pushing spring pushes the projection (124a) in the contact. The base of the plate spring (35) is bonded to a part near the base of the support plate spring (12) in one-piece by a spot welding etc. The reference (40) designates a rubber pad as the important part of this embodiment. The pad (40) is fabricated by using a sponge rubber etc. and should be made of a soft flexible material. The pad (40) is inserted between the inner surface (10a) of the edge of the holder (10) and the back surface (3b) of the head (3a) and is bonded to only either of the surface (10a) or the surface (3b). In a modification, the pad can be placed at the point (126) connecting the supporting plate spring (12) to the frame (122). The flexibility of the pad should be such as not to prevent the flexibility of the supporting plate spring (12) and the pressure of the pushing plate spring (35). In the assembly with the pad (40), the pad (40) should be kept in slight compression or only non-compressing contact in the operation as shown in FIG. 14 so as to attain this important effect. As the modification, it is possible to attain the same effect by reducing spring force of the pushing plate spring (35) for the pressure corresponding to the compression of the sponge pad (40).

The structures of the first to eighth embodiments of the present invention have been illustrated. Now, the effects in the operations of these embodiments will be illustrated.

In the first embodiment, the rubber sheet (11) is brought into contact with only the ring parts (209a), (209b) of the gimbal spring (2). The ring parts are vibrated by pitching and rolling motions of the head (3) caused by the rotation of the disc. The pitching and rolling motions are damped by friction of the rubber sheet to improve the following property of the head (3) to the surface of the disc. In the case of the sliding type head, the close contact is improved to improve the quality of the signal. In the case of the floatation type head, it contributes to give a constant floatation gap. In the low speed region of the sliding type head at the start or before the stop, vibration having low frequency can be also damped, because of the characteristics of the rubber whereby the vibration and shock between the disc and the head can be reduced to reduce wear loss.

In the second embodiment, the plate 16 is substantially equal to the contact of the rubber sheet on the head (3) whereby the vibration of the head can be reduced regardless of the vibration of the spring. In this embodiment, the friction damping of the head (3) is imparted thereby damping rapidly the vibration of the head supporting spring caused by overshoot because of remarkably large spring constant of air film in the loading of the head (3) on the disc. When this embodiment is applied to the contact slide type disc driving device wherein the head is put on during the rotation of the disc, the wave motion of the disc and the vibration of the head supporting plate spring caused by the contact shock (different frequency) can be absorbed and damped. The same effect can be obtained when the head (3) in contact sliding is shifted to the other data track, because the vibration of the head (3) caused by the wave motion of the disc and the vibration of the head (3) caused by the head-supporting plate spring resonated to the wave motion can be damped. Therefore, the seek-settling time can be shortened.

In the first embodiment, the damping effect is given by the rubber sheet (11) placed between the holder (1) and the gimbal spring (2) whereas in the third, fourth and fifth embodiments, the damping is imparted in the spring itself. The effect is similar. The ring parts (209a), (209b) of the gimbal spring (2) have different inherent (normal) vibration to cause the comprehensive vibration of the head. The vibration of the head can be internally absorbed.

The sixth embodiment imparts the effect similar to the second embodiment. The seventh embodiment also imparts the effect similar to the second embodiment. The eighth embodiment has the structure different from the first to seventh embodiments, however the principle and the effect of the eighth embodiment are similar to those of the other embodiments.

The plate spring (12) extended to the longitudinal direction has the tendency to be easily swung in the plane direction of the disc, however, the tendency is reduced by the surface friction and the internal friction of the pad (40) placed between the holder (10) and the plate spring whereby the transverse vibration of the head (3a) is absorbed and damped.

As described above, in accordance with the head-supporting mechanism of the present invention, all kinds of vibrations of the head are reduced or absorbed and damped, whereby the quality of the read-out signal by the head is improved and the wear loss between the head and the disc is reduced and the signal amplitude stabilizing period in the head-load can be reduced.

The female screw (9) of the holder (1), (10) is used for fixing the mechanism to the vertical operation arm or the swing arm or the fixed substrate.

Figure 18:
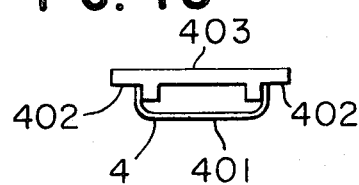
FIG. 18 is a front view of a damper assemble having frame as the important part of the first embodiment of the present invention.
Figure 19:
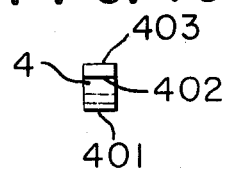
FIG. 19 is a side view of the embodiment of FIG. 18.

Thus, the same effect can be given by replacing the pad (40) used in the eighth embodiment for the strip rubber sheet (11) used in the first embodiment. The same effect can be also given by holding and fixing a ring rubber compressed in the center direction, between the end surface (10a) of the holder (10) and the head (3a) etc. When the rubber damper (4) having a frame shown in FIG. 18 or 19 is prepared for easy assembly of the rubber sheet (11) used in the first embodiment, the operation and adjustment can be easy. In FIGS. 18 and 19, the reference (401) designates a rubber sheet bonded on the frame (403) in one-piece and the lower surface of the rubber sheet is brought into contact with the ground part (204) etc.; and (402) designates a surface for fixing on the forked part (102) of the holder (1). The fixing can be easily made by using a binder. The frame (403) is a molded product made of a plastic.

What is claimed as new and desired to be secured by Letters Patent of the United States is:

1. A magnetic head supporting mechanism comprising:
   holder means;
   a gimbal spring having edge portions fixed to said holder means, a central portion and a plurality of elastic ring portions connecting said edge and central portions;
   a magnetic head fixed to said central portion; and
   damper means comprising at least one elastic sheet in sliding surface contact with said gimbal spring, whereby at least a portion of the vibration of said magnetic head is absorbed by surface friction between said damper means and said spring.

2. The mechanism of claim 1 wherein said damper means comprise two parallel elastic sheets, each having edges fixed to said holder means and being in surface contact with opposing portions of said ring portions of said spring.

3. The mechanism of claim 1 wherein said damper means comprise an elastic sheet fixed to a surface of said central portion of said spring and having the same diameter as said elastic ring portions.

4. The mechanism of claim 1 wherein said damper means comprise a plurality of radially extending sheets in surface contact with said spring and being fixed to said central portion and the outermost of said ring portions.

5. The mechanism of claim 1 wherein said damper means comprise an elastic sheet having outer edges fixed to said holder means and a central aperture, the edges of said sheet adjacent said central aperture being in surface contact with said central portion of said spring.

6. The mechanism of claim 1 wherein said sheets comprise continuous bands.

7. The mechanism of claim 1 wherein said damper means comprise an elastic pad having one end in surface contact with said holder and said head, sand pad being fixed to only one of said holder and said head.

8. The mechanism of claim 1 wherein said elastic material is an elastomer.

9. A magnetic head supporting mechanism, comprising:

holder means;

a gimbal spring having edge portions fixed to said holder means, a central portion and a plurality of elastic ring portions connecting said edge and central portions;

a magnetic head fixed to said central portion;

a rigid plate having the same diameter as said ring portions and being in surface contact with said spring; and damper means comprising two parallel elastic sheets, each having edges fixed to said holder means and being in sliding surface contact with opposing portions of said rigid plate, whereby at least a portion of the vibration of said head is absorbed by surface friction between said sheets and said plate.

10. The mechanism of claim 9 wherein said elastic material is an elastomer.

* * * * *